Oct. 29, 1929.  E. A. VESSEY  1,733,704
SPEED CHANGING MECHANISM
Filed June 30, 1924  10 Sheets-Sheet 2

Inventor
E. A. Vessey
By Marks & Clerk
Attys.

Oct. 29, 1929.　　　　E. A. VESSEY　　　　1,733,704

SPEED CHANGING MECHANISM

Filed June 30, 1924　　　10 Sheets-Sheet 3

Inventor
E. A. Vessey
By Marks & Clerk
Attys.

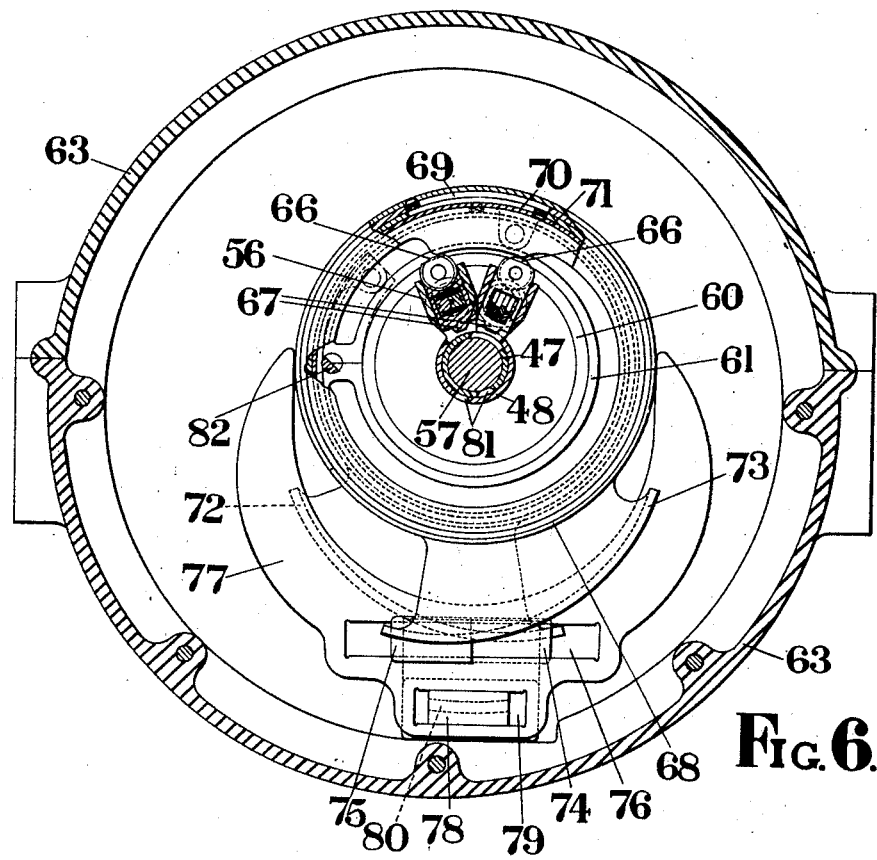
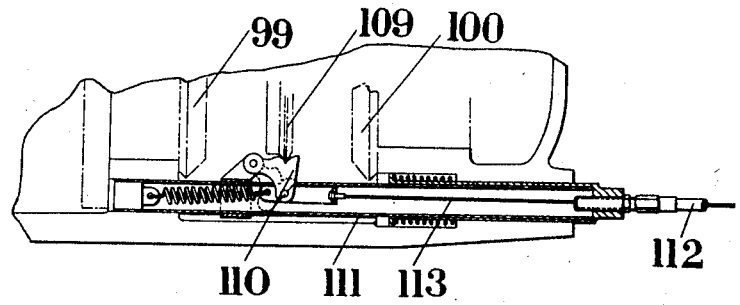

Inventor
E. A. Vessey
By Marks & Clerk
Attys.

Oct. 29, 1929.  E. A. VESSEY  1,733,704
SPEED CHANGING MECHANISM
Filed June 30, 1924  10 Sheets-Sheet 8

Inventor
E. A. Vessey
By Marks & Clerk
Attys.

Oct. 29, 1929.  E. A. VESSEY  1,733,704
SPEED CHANGING MECHANISM
Filed June 30, 1924    10 Sheets-Sheet 9

Inventor
E. A. Vessey
By Marks & Clerk
Attys.

Inventor
E. A. Vessey
By Marks & Clerk
Attys.

Patented Oct. 29, 1929

1,733,704

UNITED STATES PATENT OFFICE

ERNEST ABINGTON VESSEY, OF LONDON, ENGLAND

SPEED-CHANGING MECHANISM

Application filed June 30, 1924, Serial No. 723,339, and in Great Britain July 11, 1923.

This invention relates to infinitely variable gears of the type wherein a rigid wheel or the like is secured to a driven shaft and is adapted to be driven by pawls or the like connected by links to a driving shaft so that upon mutually displacing the axes of the two said shafts a variation in speed ratio is produced. Experience has shown that in such gears in consequence of the necessity in practice for using links which are relatively short in comparison with the length of the driven lever, and therefore in consequence of the varying obliquity of the link for various angular positions of the driving lever, the angular velocity of the pawls, especially with the higher gear ratios, varies during the arc of contact to a very considerable degree. The effect in practice with slow running gears is to cause a considerable variation in the angular velocity of the driven shaft accompanied at some periods by a reversal of the forward driving effort, or with fast running gears having high momentum or driving other units having high momentum, of heavy and highly variable stresses in the mechanism accompanied by intermittent driving action and resulting in serious wear upon the driving surfaces.

The object of the present invention is to obviate these drawbacks and to provide constructions in which certain other advantages, as are indicated below, may be achieved.

In order to compensate for the varying obliquity of the relatively short link and to ensure for any specified gear ratio within the limits of the mechanism that the angular velocity of and torque applied to the driven shafts shall be constant throughout the arc of contact, I either arrange that the crank pin of the driving lever shall be caused to describe a path in space which is an ellipse and not a circle, as used hitherto (except in the special case mentioned later) or I provide a divided link, hinged at some point in its length, and cause the hinge pin to describe an ellipse.

In either case the dimensions of the ellipse and its disposition relative to the centre of the driving shaft will not be constant but will require to be varied for each individual speed ratio. For instance, when the speed ratio of the gear is 1/1 the crank pin path is required to be a circle (a circle being mathematically a special form of ellipse). As the speed ratio increases the ellipticity of the path also increases, rapidly at first, to a maximum, after which it decreases more slowly towards a circular form. The angular position of the axes of the ellipse with respect to the vertical for various ratios also requires to be varied, as also does the position of the centre of the ellipse with relation to the centre of the driving shaft.

The present invention consists in an infinitely variable gear of the type described wherein the driven member, when under conditions of drive, is constrained to perform substantially uniform angular motion.

The invention further consists in an infinitely variable gear of the type described wherein the pins of the driving members under conditions of drive are constrained to move alternatively in a circular or an elliptical path, as required.

The invention further consists in an infinitely variable gear of the type described including a crank and crank pin partaking of a circular motion, a link pivoted to the crank pin and to a driving member and means effective to restrain the latter pivoting point alternatively to an elliptical or a circular path as required.

The invention further consists in an infinitely variable gear of the type described wherein practically uniform angular motion is imparted to the driven shaft during drive under all speed ratio settings within the capacity of the gear by the provision of ellipse generating mechanism and means for varying the ellipticity of the ellipse, the eccentricity of the axis of said mechanism relatively to the axis of the driving shaft and the angular position of the axes of said mechanism.

The invention further consists in an infinitely variable gear of the type described wherein approximately uniform angular motion is imparted to the driven shaft during drive under all speed ratio settings within the capacity of the gear by the provision of mechanism serving to produce mean elliptical motion of the driving crank pins and of means for varying the eccentricity of the axis of said mechanism relatively to the axis of the driving shaft.

The invention further consists in an infinitely variable gear as set forth above including means incorporated with the gear for adjusting by power the speed ratio of the gear under the control of the driver.

The invention further consists in an infinitely variable gear as set forth above including power-operated control means whereby the speed ratio of the gear is automatically adjusted, without the intervention of the driver, to suit the load of the moment and thus to allow the speed of the engine or other driving unit to remain constant at any predetermined value and to provide means of substituting instantaneously voluntary control by the driver in place of the automatic control.

The invention further consists in an infinitely variable gear of the type described including means for effecting positive coupling between the driving and driven members of the gear during the arc of drive, substantially as herein described.

The invention further consists in an infinitely variable gear of the type described embodying a reversing gear, substantially as herein described.

The invention further consists in an infinitely variable gear of the type described embodying pawl-actuating mechanism, substantially as herein described.

The invention further consists in an infinitely variable gear of the type described embodying duplicating mechanism, substantially as herein described, for driving and controlling the path of a second or any reasonable number of crank pins without duplicating the ellipse generating mechanism.

The invention also consists in infinitely variable gears, substantially as herein described with reference to the accompanying drawings.

Referring to the accompanying drawings:—

Figure 6 is a vertical cross-sectional view thereof on the line 6—6 of Figure 1;

Figure 9 is a vertical cross-sectional view thereof on the line 9—9 of Figure 1;

Figure 1:
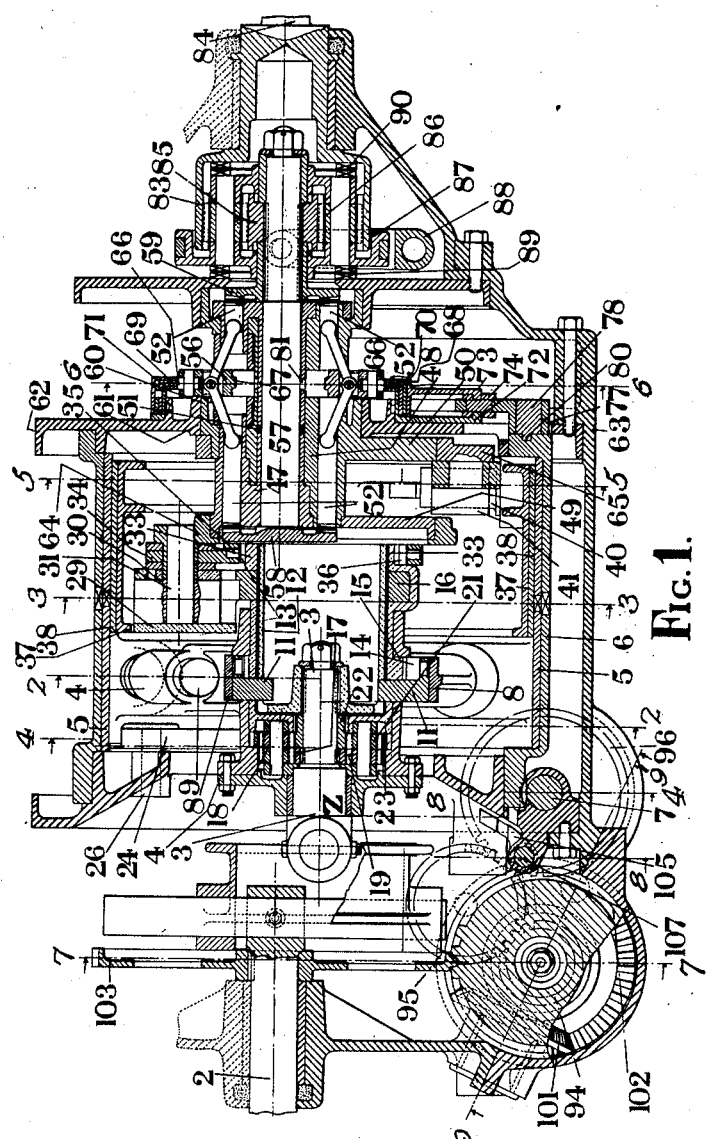
Figure 1 is a vertical longitudinal section through a construction of gear in accordance with the present invention wherein absolutely uniform rotation is achieved at all gear ratio settings within the range of the gear.
Figure 2:
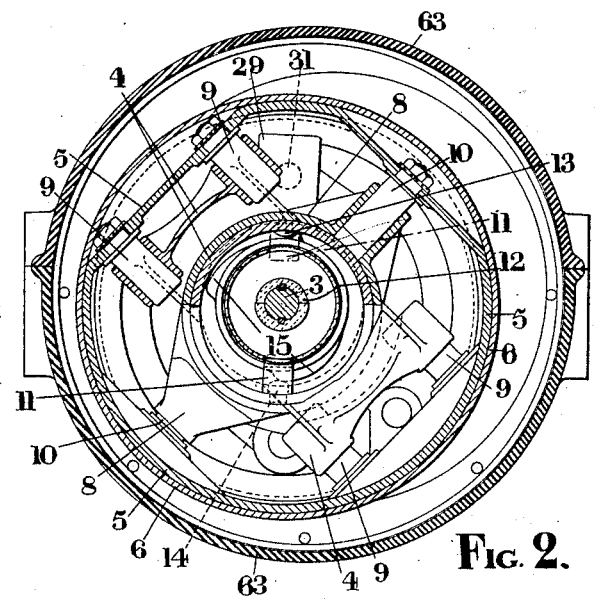
Figure 2 is a vertical cross-sectional view thereof on the line 2—2 of Figure 1.
Figure 3:
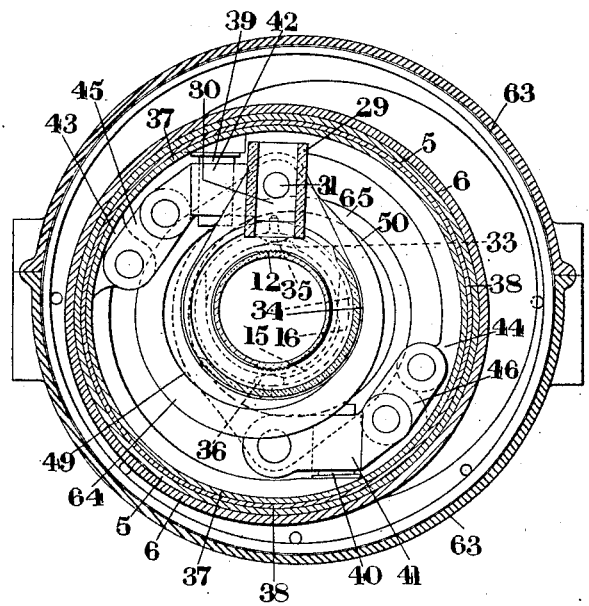
Figure 3 is a vertical cross-sectional view thereof on the line 3—3 of Figure 1.
Figure 4:
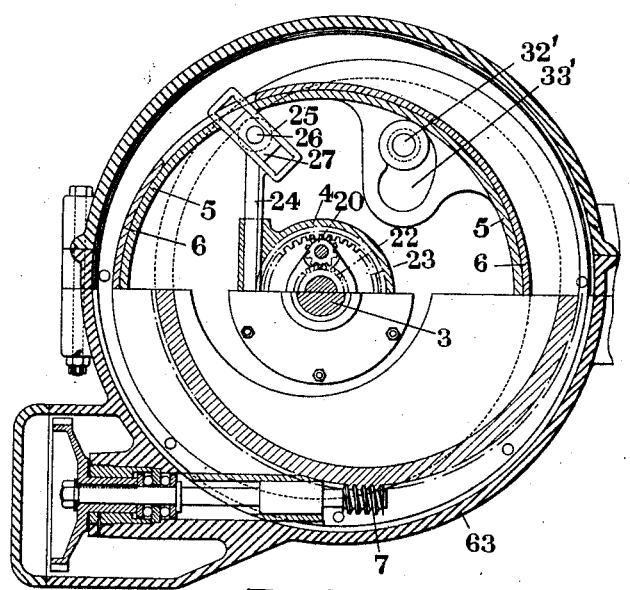
Figure 4 is a vertical cross-sectional view thereof on the line 4—4 of Figure 1.
Figure 5:
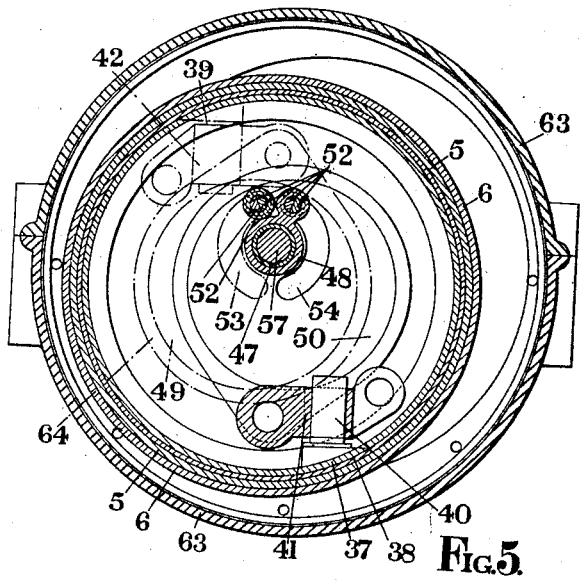
Figure 5 is a vertical cross-sectional view thereof on the line 5—5 of Figure 1.
Figure 7:
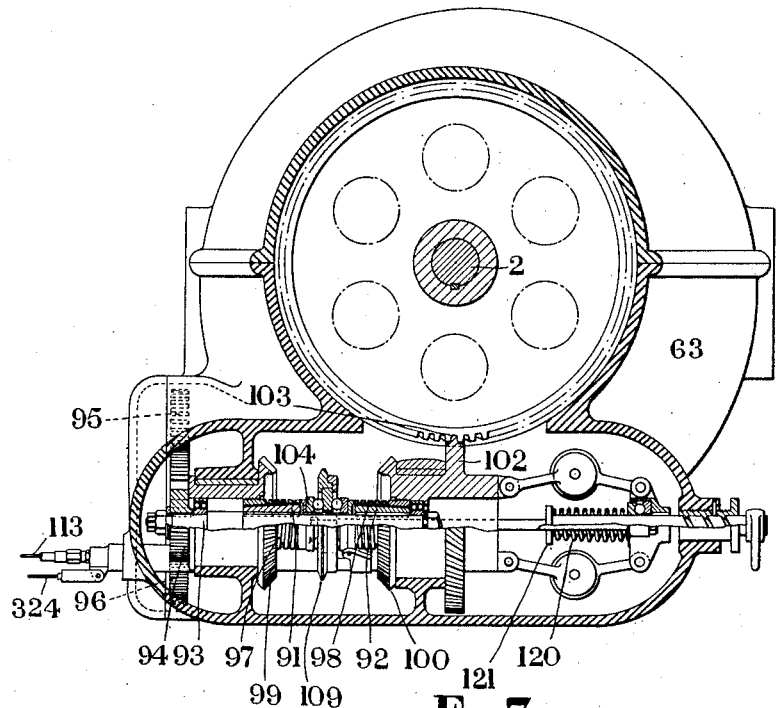
Figure 7 is a vertical cross-sectional view thereof on the line 7—7 of Figure 1.
Figure 8:
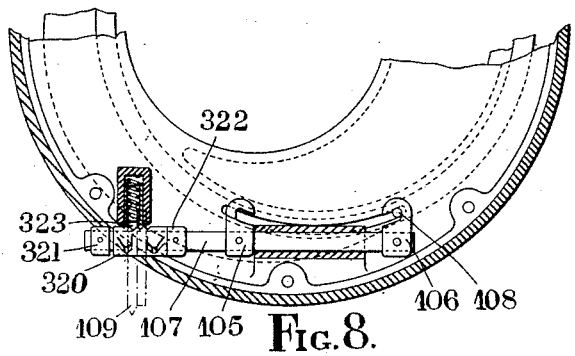
Figure 8 is a vertical cross-sectional view thereof on the line 8—8 of Figure 1.

According to Figures 1 to 9, one example of a complete gear, as applied to mechanically-driven vehicles, is illustrated. The gear comprises the following components which will be described seriatim:—

(1) The universal coupling.
(2) The ellipse generator.
(3) The duplicator.
(4) The speed varying mechanism.
(5) The pawl operating mechanism.
(6) The reversing gear.
(7) The automatic power control.

In carrying the invention into effect according to this example employing the preferred method, i. e., that in which the crank pin of the driving lever is constrained to move in ellipses or in a circle:—

The universal coupling is of any known type, such as the Oldham coupling, which allows parallel displacement of the axis of the ellipse generator in any direction relatives to that of the driving shaft. 2 represents the driving shaft and 3 the shaft coupled thereto.

The ellipse generator consists of three members one of which, 4, is slidably mounted on pins 9 in a frame 5 capable either of rectilinear displacement in a plane at right angles to the axis of the gear or, as shown, capable of displacement in a plane at right angles to the axis of the gear about a centre situated eccentrically with respect to the centre of the driving shaft 2.

The frame 5 is rockably carried in an eccentric sleeve housing 6.

Movement of the sleeve housing 6 is achieved by means of a worm 7 engaging a toothed portion of the sleeve housing 6.

The second member 8 of the generator is slidably mounted on pins 10 in the same frame 5 in such a manner as to be movable in the same plane as the first member but in a direction at right angles to that of the first member. The lines of motion in the frame 5 of these two reciprocating members 4 and 8 constitute the two axes of the ellipse.

The two reciprocating members 4 and 8 are mutually coupled by means of a crank pin or eccentric 11 which is carried by the member 4 in the member 8 and is rotated by means of a driving sleeve 12 rigidly attached to the shaft 3. This drive is effected by providing radial fingers projecting inwardly from the eccentric 11, which fingers engage slots formed in the sleeve 12. These fingers also pass through elongated slots formed in the sleeve 12.

The throw of the eccentric is adapted to be varied with changes of gear by any suitable means but preferably by an eccentric or double-acting cam. The member 15 constitutes such an eccentric which engages inwardly projecting plugs 13, 14 on the eccentric 11. This member 15 is rotatably mounted within the boss of the member 4 and is displaceable angularly during reciprocation and rotation of the latter by means of a special form of differential gear coupled so as to operate synchronously with the displacement of the frame 5.

This differential gear comprises a sun pinion 17 rigidly secured to the shaft 3, planet pinions 18 and 19 meshing therewith and meshing with internal teeth formed within the sleeve portion of the member 4 respectively.

The spindles carrying the planet pinions 18, 19 are mounted in a loose cage and carry also two further planet pinions 20, 21. These latter mesh with external teeth formed on the member 22 and mesh with an internally toothed ring 23. The member 22 is keyed to the member 15 and the ring 23 also bears external teeth which engage a rack 24. This rack carries a crosshead 25 which embraces a slide block 27 on a pin 26 (Figure 4) rigid with the stationary gear casing and the rack is capable of reciprocation within the member 4 which guides it. The crosshead slides are parallel to the pins 9 and thus the reciprocation of the member 4 does not cause rotation of the ring 23. Rocking of the frame 5 during gear change, however, causes the rack to move within its guide in the member 4 and thus effect partial rotation of the ring 23, thereby advancing or retarding the phase of the member 15 relatively to the shaft 3.

The shaft 3 is rotatably mounted in a bearing formed in the reciprocating member 4 and the sleeve 12 carries at its remote end, at right angles to the axis and in the plane of rotation, a radial crank 16. The crank is secured to the sleeve 12 in a rotationally rigid fashion, e. g., by means of serrations.

This crank, due to the harmonic motion set up by the two sliding members superimposed upon the circular motion of the third member, will describe either a circle or a series of ellipses of ellipticity variable under the control of the mechanism, which will be described below.

The frame 5 of the ellipse generator, in addition to being capable of a curved movement in a plane at right angles to the axis by the eccentric rocking of its housing 6, as already described, is capable of angular movement about its own axis in the same plane in order that adjustment of the angular position of the axes of the ellipse may be effected. This movement may be controlled, in one form, by means of a pin or roller 32' (Figure 4) fixed in the gear case and working in a slot 33' of suitable formation in the frame 5 so arranged that for any given displacement of the housing 6 the correct angular setting of the frame is obtained synchronously.

The generator frame 5 is rotatably mounted in the housing 6 which itself is eccentrically supported on the gear case so that for any speed-ratio-setting the corresponding vertical and horizontal displacements of the centre of the ellipse are effected in synchronism and individually are appropriate for that setting. The crank 16 embodies a radial slide 29 in which there is a slide block 30 carrying the main crank pin 31 and the throw of the crank pin is arranged to be varied by means of a further cam surface 33 formed on the member 15. This cam surface coacts with two pins 35, 36, on a connecting strap link 34 (Figure 3) which is pivoted at one end to the crank pin 31. The motion of this crank pin is repeated in a duplicate crank pin 32 by means of duplicator mechanism, as described below.

The duplicator consists of two sleeve members 37, 38, one arranged to oscillate within the other.

The outer sleeve 38 is rotatably mounted within the frame 5 of the ellipse generator so as to be always concentric with the ellipse and is rotated by means of an inwardly projecting radial pin 39 slidably connected to the main crank pin 31 by means of the member 42. At a suitable position around the circumference of the sleeve 38 is another inwardly projecting radial pin 40 adapted to slidably receive a further member 41 coupled to the subsidiary crank pin 32.

The inner sleeve 37 which is slotted to accommodate the pins 39 and 40 of the sleeve 38 and allow of small angular displacement with respect to it carries two inwardly projecting lugs 43, 44, which are coupled by links 45, 46, respectively, to the members 42, 41. The pins 39, 40 of the outer members are arranged with their axes inclined to the radius in such way that radial movement of the main crank pin 31 within the sleeve 38 will cause the inner sleeve 37 partially to rotate and by its rotation reproduce in the subsidiary crank pin 32 movement similar in all respects to that of the main crank pin. The crank pins may be described as intermediate driving members. More than one subsidiary crank pin may similarly be employed, if desired.

The speed varying mechanism may be precisely similar to that described in British Patent No. 18,909 of 1913 with the exception that the long double-ended driving crank as used thereunder is replaced (according to the present invention) by the combination of the universal coupling, the ellipse generator and the duplicator. Further, according to the present invention the short cranks with their crank pins are replaced by eccentrics formed one on each variable speed sleeve. Eccentric straps rotatably embracing the eccentrics and carrying respectively the main and subsidiary crank pins of the gear are substituted for the bent links originally used.

As shown in the drawings (Figures 1, 5 and 6) two variable speed sleeves 47, 48 are provided and each is furnished respectively with an eccentric 49 and 50 and at the end opposite to that carrying the eccentrics with a flange between which and the eccentric extends a housing or bearing bored parallel to the axes of the gear to slidably receive the pawls, of which it carries a pair at each end. These variable speed sleeves constitute alternately operating driving members for the driven shaft. One variable speed sleeve is arranged to penetrate the other and is rotatably carried therein, the inner sleeve 47 being divided in a plane at right angles to the axis for ease of erection, the two halves being suitably keyed at 51 to rotate as one when assembled.

The pawls 52, of which there are eight, arranged in four pairs, are of semicylindrical section, a pair of pawls thus forming a complete cylinder but being axially slidable with relation to one another. On one end of each pawl are cut teeth or serrations of special V-formation but considering any completed pawl cylinder the teeth of one pawl are displaced with respect to those of the other pawl by half of one pitch, i. e., if, at the joint between them, one pawl commences with a tooth the other will commence with a tooth space. Similarly, corresponding pawls at opposite ends of a variable speed sleeve will have teeth varying by half of one pitch.

In cases where the radius at which the pawls operate falls within the profile of the eccentrics 49, 50 appropriate circular slots 54, 53 in the body of the eccentric to allow of the relative angular movement of the pawls are provided.

Each pair of pawls in two opposed cylinders is connected by a simple toggle pair, the members of which are hinged together at one end and pivotally connected, each to a pawl, at the other.

The hinged end of a toggle pair is arranged free to slide at right angles in a plunger 56 slidable radially with respect to the axis of the variable speed sleeves but is constrained to move radially simultaneously with the plunger. Thus, when the plunger is moved radially in one direction the pawls 52 are caused by toggle action to project beyond the face of the eccentrics and when moved in the other direction are withdrawn.

Rotatably carried within the variable speed sleeves is a shaft 57 on which are rigidly fixed two discs, 58, 59, upon one face of each of which are cut radial teeth or serrations throughout the circumference and of similar form to those on the pawls 52. The serrated faces, separated by the variable speed sleeves, are arranged vis-à-vis with teeth in one opposite teeth in the other, the teeth in the discs being thus in a position to receive the teeth of the pawls, when the latter are projected beyond the face of the eccentrics, by means of the toggles.

By this arrangement it follows that if, at a particular gear ratio, the teeth on any given pawl 52 are so situated with respect to those of the corresponding disc 58 or 59 that when projected by the toggles they meet point to point, the teeth in the pawls at the opposite end of the variable speed sleeve will be in a position to fully engage with those of their respective disc, the whole toggle system sliding axially with respect to the gear to enable them to do so. In this manner a form of differential engagement is secured whereby, for any given variable speed sleeve, the sum of the depths of engagement of all four pawls must under all conditions be equal to at least two full depth engagements.

Integral with the eccentric of the outer variable speed sleeve 48 is a boss 60 formed concentric with the bore of the sleeve; this boss 60 being rotatably mounted in corresponding bearings 61 formed in or fixed to a bearing plate 62 attached to the casing 63 of the gear.

The two crank pins 31, 32 are coupled to the eccentrics 49 and 50 respectively by means of links or eccentric straps 64 and 65.

By the means described, positive coupling between the driving shaft 3 and the driven shaft 57 is secured and since for any given variable speed sleeve opposite pawls react upon each other with forces which are always equal and opposite, no unbalanced thrust remains to be taken by the non-rotating members or the gear case, the pressure being distributed internally between the discs 58 and 59. Also, since the pressure between pawls and discs is applied by a toggle the operating force is relatively small and since when the pawls are fully engaged the two members of the toggle are almost co-linear the force required to maintain them in position is practically negligible.

At the outer end of each toggle plunger 56 is provided a roller 66 for engagement with the cam surface of the pawl operating mechanism (described below). At the inner end of the plungers are formed small conical projections 67 the purpose of which will be described below in connection with the pawl operation.

The pawl operating mechanism consists of an annular cam arranged concentrically with the variable speed sleeves 47, 48, and encircling them, made preferably in four parts 68, 69, 70, 71, each part being in the form of an inwardly flanged ring having the flange at one end of the ring. The four rings are arranged telescopically (Figure 1) with their flanges abutting and are capable of being independently rotated or rigidly fixed as described below. The inner periphery of all the flanges is machined to such a form that as the variable speed sleeves with their toggle plungers rotate within the cam ring with the toggle rollers 66 running on the inner periphery of the cam flanges, the pawls are alternatively pressed into contact with the driving discs or allowed to be forced out of contact under the wedge action of the pawl teeth, the relative length of the high and low part of the composite cam surface being so proportioned that when the cam rings are revolved so that the high part of all the cam surfaces coincides, the correct arc of pawl contact is given for the highest gear ratio for which the gear is designed. By suitable rotation of the cam rings 68, 69, 70, 71 with respect to one another the high part of the composite cam surface may be increased in span to nearly four times that when the surfaces are coincident and therefore the duration of pawl engagement may be varied to suit the requirements of the gear ratio.

The assembled cam is rotatably supported on a bearing forming part of the bearing plate 62 and the lengthening and shortening of the composite cam surface is accomplished in the following manner:—The extreme inner and outer cam rings 71 and 68 are each provided with inwardly projecting rim portions 72, 73, respectively. These rim portions engage grooves formed in blocks 74, 75, respectively, which latter are in turn slidably carried in a slot 76 in a forked member 77. This forked member straddles the outermost cam member and below the slot 76 bears another slide block 78 in a further slot 79.

This block 78 carries a curved projection 80 engaging a groove in the housing 6, this groove being of such a curvature that when the ellipse generator is laterally displaced to vary the speed-ratio-setting the inner and outer cam rings 71 and 68 are synchronously rotated in opposite directions by an amount sufficient to give the corresponding correct length of pawl contact. Of the remaining two cam rings 70 and 69 the latter is coupled to the outer ring 68 and the former to the inner ring 71 in such a manner that as each is almost uncovered it is drawn after its mate in much the same manner as the leaves of a fan.

The high part of the cam surface is so proportioned that when the toggle rollers 66 are in contact with it the two members of the toggle are almost in line. The pressure between the roller and cam surface to keep the pawls in contact is therefore very small. The collapsing tendency of the toggles is, however, sufficient to allow the pawls 52 to disengage automatically by virtue of the wedge action of the teeth immediately the roller 66 leaves the high part of the cam surface.

When the gear is set for direct drive (i. e., when the gear ratio is 1/1) it is desirable that there should be no contact between the cam surfaces and the toggle roller and this is accomplished automatically in the following manner:—

When the gear ratio is 1/1 the high part of the cam surface is a semicircle, also each pair of pawls in one variable speed sleeve is diametrically opposite those in the other sleeve. If, therefore, when the sleeves are in this position conical holes 81 are provided in the body of each opposite the conical projection 56 on the inner end of the toggle plunger of the other it will be possible in this position, and in this position only, to press the toggles completely over their own dead centre, in which position they will be retained by the driving force between the pawls and discs.

In order to provide the extra push to the toggle plungers the high part of the cam surface of the extreme inner cam ring 71 is hinged towards the end first met by the rollers as they pass it, the other end being pressed radially inwards by a light spring in such a manner that as the roller is passing it, it is first pressed back into its normal position but immediately the roller has passed it is caused to project beyond the normal high cam surface to a sufficient amount to give the extra movement required to force the toggle over its dead centre. At the instant when the high cam surface becomes a semicircle the hinged leaf of the innermost cam ring 71 makes contact with a small wedge or stop 82 carried upon the bearing bracket of the case, so obtaining the support necessary to complete the toggle travel of each plunger as it passes.

Upon the speed-ratio-setting being changed the relative motion between the variable speed sleeves forces the toggles, by means of the conical projections 56 on the toggle plunger, across the dead centre and so allows the driving pressure between the pawls and discs to effect disengagement automatically as before when the high part of the cam is passed. At the same time, the hinged cam surface is withdrawn from contact with the wedge or stop 82, leaving it free to assume its normal freedom of action.

The reverse gear comprises a simple epicyclic train comprising a sleeve 83 with internal spur teeth integral with or rigidly attached to the last driven shaft 84 of the gear, a central pinion 85 rigidly attached to the variable speed shaft 57 (and therefore always revolving in the same direction as the engine) and two or more planet pinions 86 engaging with the internal wheel and the central pinion. The planet pinions are free to rotate on separate spindles carried at opposite ends of a diameter in a cage 87 rotatable in a plane at right angles to the axis of the gear and capable of being displaced axially with respect to the gear under the control of a fork 88 operated by levers and rods or by any other suitable means from the driver's seat. On both ends of the cage are formed clutch teeth, those on the forward end engageable with corresponding teeth 89 formed in or rigidly attached to the gear case, and those at the rear end engageable with corresponding teeth 90 formed on the inner face of the web of the sleeve 83.

By this means, when the cage 87 is in the backward position it is coupled direct to the sleeve 83 by means of the rear clutch, relative motion between them cannot take place and consequently the teeth of all the wheels act as keys and the sleeve 83 is driven in the same direction as the central pinion.

On the other hand, when the cage is in the forward position it is held at rest by means of the forward clutch, the sleeve 83, through the agency of the planet pinions 86, being therefore driven in the reverse direction to the central pinion 85.

A neutral position is provided when the cage is midway (as is indicated in Figure 1) between its extreme forward and backward positions and a definite stop is provided on the operating quadrant to locate this position.

The speed of the vehicle may obviously be varied in the same degree whether it is being driven forward or backward, but means are provided whereby the clutch-operating gear may be interlocked with the speed-varying mechanism in such a manner that it is impossible to start the car in either direction except when the gear is set for the lowest gear ratio. When the gear is fitted with full automatic control such interlocking, however, is usually unnecessary.

The automatic power control comprises a pair of clutches of special design the cones 91, 92 of which are rigidly attached to the spindle 93 which is connected to the worm 7 mentioned in connection with the ellipse generator through a train of gear wheels 94, 95, 96. Each cup 97 and 98 is attached respectively to a bevel wheel 99, 100, arranged to rotate freely in bearings provided in the gear case with the large ends of the cups facing each other, the bevel wheels 99, 100 being connected by means of a third bevel 101 running in a plane at right angles to their plane of rotation. The bevel wheel 100 is coupled by means of skew wheels 102, 103, or some other suitable arrangement, to the first drive shaft 2 of the gear so that all bevels are constantly in motion as long as the main clutch is in gear. The cups are of special design, being made in the form of helical springs bored conical on the inside to fit the cones, one spring being made right-handed and the other left-handed. Between the cups and coaxial with them is arranged a collar 104 adapted to be moved axially, either automatically under the agency of a spring-controlled governor of the centrifugal type or through the agency of levers and rods or other suitable means by the driver. The collar is of such a thickness that when in the central position its compresses both spring cups 97, 98, sufficiently to leave them rotationally free in relation to the cones 91, 92, but if it or the ring 109 attached thereto be displaced axially either in one direction or the other it releases one or other of the springs as the case may be and allows it to grip and drive its respective cone, thus through the agency of the worm and wheel altering the gear ratio. Stops 105, 106 on a sliding bar 107 are provided and a pin 108 is provided on the housing 6 so that when the extreme ratios of the gear are reached the collar 104 and ring 109 are suddenly returned to their central position, no matter whether they be operating at the time under control of the driver or governor. This is effected by the provision of a fork 320 loosely keyed upon the bar 107 between collars 321 and 322, which fork loosely straddles the ring 109 so that the ring having been returned to its central position by one fork limb, thus disengaging both clutches, is still free to move in such a direction as to engage the clutch other than the one which has placed it centrally. A spring operated locating plunger 323 is provided to hold the fork limbs either in extreme or mean positions and to cause sudden termination of the stroke. This plunger also serves to impart slight relative motion between the fork 320 and the bar 107 in order to effect complete disengagement of the clutch concerned. A small lever 110 is provided and is capable of being caused to engage ring 109 when the driver desires to assume control. This lever 110 is pivoted to a lug attached to a tube 111 against the remote end of which the outer casing of a Bowden control 112 abuts.

By this means by pulling the inner member 113 relatively to the member 112 the lever 110 is caused to engage the ring against the tension of the return spring provided, whereas by subsequent concerted movement of both members 112 and 113 the ring 109 is moved in either direction against the pressure of the compression spring provided. This concerted action is effected by connecting the member 113 to a control lever (not shown) so that by raising or lowering the latter the necessary movement of 113 to engage the lever 110 is effected.

To the same control lever is attached a further Bowden control member 324 (Figure 7) in such a manner that horizontal movement of the said lever causes the concerted movement of both members 112 and 113.

The tension on the controlling spring 120 of the governor is adjustable within wide limits while in operation by a lever-operated screw abutment 121 and means (not shown) are provided for locking the lever in any predetermined position.

The operation of the governor is as follows:—Assuming that the vehicle be standing and it is desired to start; the engine is running and the reverse lever is in the neutral position. The clutch is withdrawn in the usual manner and the reverse lever placed in forward drive position. The engine is accelerated and the clutch is engaged gradually. Immediately the engine feels the load of the vehicle it will decelerate should the gear ratio be insufficient to start the vehicle; the governor balls will partially close and in so doing will release one spring cup and engage the other, causing the ellipse generator to move in such a direction as to increase the gear ratio and will leave this clutch in operation until such time as the vehicle begins to move. The engine speed will now be increasing and the governor balls moving farther and farther apart, so bringing the clutch collar back to its central position. As the engine tends to race the other clutch is put into operation and the gear ratio is gradually reduced as the speed of the vehicle increases until when the gear is in direct drive the governor is cut out by the automatic stops. Should the vehicle now commence to mount a hill sufficiently steep to reduce the engine speed below normal the governor closes and thereby increases the gear ratio until the normal engine speed is re-attained, after which it gradually reduces the gear reduction once more.

By suitably adjusting the governor control spring it will be possible to limit the maximum speed of the vehicle to any predetermined figure and it is suggested that this facility may be of great use to the police in dealing with persistent offenders against the public safety and is likely to be more efficacious than cancellation of license.

The improved gear has been described in the above example particularly with respect to its application to the driving of mechanically propelled vehicles but it is understood that when otherwise applied one or more components or any or all of the various adjustments may be omitted as may be consistent with the application required.

In operation, when applied to the driving of mechanically propelled vehicles, the shaft 2 has power applied to it from the engine (preferably through the intermediary of a friction clutch) and assuming the gear is set to some ratio other than 1 to 1—say 4 to 1—the rotation is communicated to shaft 3 through the Oldham type coupling. The shaft 3 is rigidly attached to the sleeve 12 which in turn being coupled to the eccentric 11 by means of the inwardly projecting fingers causes the eccentric 11 to rotate with the shaft 3. Rotation of the shaft 3, sleeve 12 and eccentric 11 therefore causes the reciprocating members 4 and 8 to reciprocate along straight lines at right angles to each other under the constraint of their respective guides 9 and 10, and the crank pin 31 therefore describes elliptic motion, the character of which is determined by the length of the crank and the eccentricity of the eccentric with respect to the common centre of the shaft 3 and sleeve 12. This elliptical motion is conveyed by the duplication mechanism to the second crank pin 32, and these pins drive the two variable sleeves 47 and 48 respectively through the intermediary of eccentric straps 64, 65, and eccentrics 49, 50. The variable speed sleeves alternately during the arc of drive are clutched to the serrated discs 58, 59 on the shaft 57 by means of the pawls 52, toggle mechanism and cam rings 68, 69, 70 and 71. Uniform rotation is then conveyed to the driven shaft 84 of the gear either directly or through the intermediary of the reversing mechanism 83, 85, 86, 87 and 88.

Figures 10, 12:
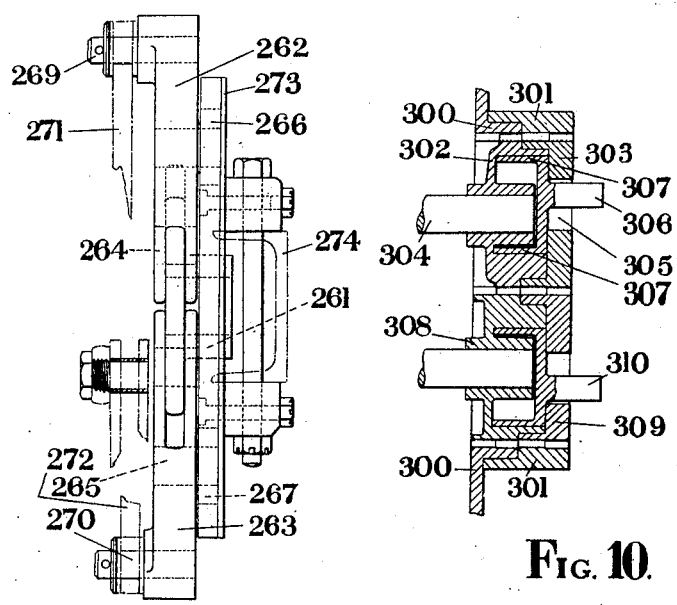
Figure 10 is a vertical cross-sectional view of a modified form of duplicator mechanism.
Figure 12 is a side elevational view corresponding to Figure 11.

Various modifications in the gear described above may be made. For example, the ellipse generator in another form, as illustrated in Figure 10, consists of two similar internally toothed gear wheels 300, 301, arranged concentrically and side by side.

Gearing with these internally toothed wheels are spur planet wheels 302 and 303 respectively of half the diameter of the wheels 300, 301, the two planet wheels being arranged mutually concentrically, side by side and rotatably mounted upon the same crank pin 304 which is carried at the end of a lever (not shown) rotatable about the common centre of the wheels 300, 301.

The lever is driven by the engine through the agency of a universal coupling of the type described above in such a manner that it allows of parallel displacement in any direction of the axis of the wheels 300, 301, with respect to the driving shaft of the gear.

In the planet wheel 303 is provided a radial slot 305 or bearing in which the main crank pin 306 of the gear may slide. The crank pin 306 is integral with a second crank pin 307 which is carried by the second planet wheel in such a manner that relative rotation between the planet wheels 303, 302 will radially displace the main crank pin 306 of the gear with respect to the axis of the crank pin 304.

When the centre of the main crank pin 306 is coincident with the centre of the pin 304 the path of space of the former will be a circle, but for any other setting of 306 its path in space will be an ellipse, the sum of the axes of the ellipse being constant but the ellipticity increasing as the eccentricity between the main crank pins 306 and 304 is increased.

The internally toothed wheel 301 is supported in the gear case in a manner similar to that described above for the ellipse generator frame, i. e., it may be rotated through small angles about its own centre and may also be disposed in a plane at right angles to the gear axis about a centre situated eccentrically with respect to the centre of the driving shaft, or may be capable of rectilinear displacement in a plane at right angles to the gear axis.

The wheel 300 is rotatably mounted within the wheel 301 and may be partially rotated with respect thereto by means of a suitable arrangement of lever and link motion (not shown) coupled in such a manner that for any given displacement of the wheel 301 with respect to the gear axis its correct angular position and the eccentricity of the main crank pin 306 are synchronously given.

In a modification of the form of ellipse generator last described the two planet pinions are both directly mounted upon the lever crank pin. One planet wheel is provided with a radial slot in which a sliding block carrying the main crank pin slides. This block carries a second crank pin which is coupled by means of a link to a crank pin on the second pinion. Thus, as before, when the centre of the main crank pin is coincident with the common planet centre the path in space of the main crank pin will be a circle, but for any other setting of the main crank pin the path in space will be an ellipse, the sum of the axes of the ellipse being constant but the ellipticity increasing as the eccentricity between the main crank pin and planets is decreased.

Instead of the duplicator described above a second pair of planet wheels 308, 309, similar in all respects to the first pair and gearing with the same pair of internal wheels 300, 301 respectively are provided, both pairs being sufficiently separated axially, as shown (Figure 10), to allow the rims to clear and the common centre of one pair being diametrically opposite that of the other. 310 then constitutes the subsidiary crank pin.

In the alternative type of gear in which divided links are used either of the above-described ellipse generators may be used but so modified that the elliptic motion is applied to the hinge pin at the junction of the divided link, the main crank pin in this type describing at all times a circle, as in British Patent No. 18,909 of 1913. An example of such construction is illustrated diagrammatically in Figure 11, in which 260 represents a double-ended crank, the boss 261 of which is carried rigidly by the driving shaft (not shown) on a fixed axis. Links 262, 263 are pivoted at 264, 265 respectively to the two ends of the crank 260 and carry rollers 266, 267 engaging a double cam track 268.

The remote ends of these links are pivoted to the driving links 271, 272 by means of hinge pins 269, 270 respectively, the latter being adapted to drive in turn as before.

The cam tracks are formed on a member 273 which is so mounted upon the frame 274 as to be capable of the angular movement necessary to vary the axes of the ellipse.

Means (not shown) are also provided whereby the eccentricity of the centre of the elliptic motion may be altered, e. g. by so mounting the frame on a pivot as to be capable of rocking movement.

Figure 11:
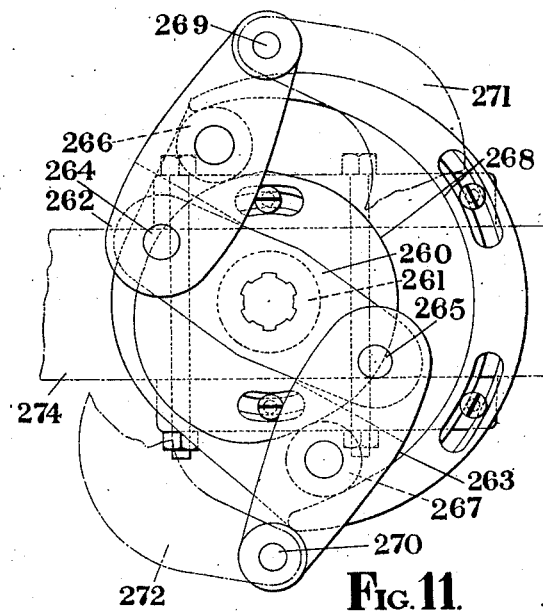
Figure 11 is an end elevational view of a modified form of ellipse generator mechanism.

The sibsidiary crank pin 270, as shown in Figure 11, may be fitted with a roller revolving on the same elliptic cam and driven in the same manner as the main crank pin 269 or a duplicator as already described may be used with this type of gear.

According to a further modification, as illustrated in Figures 13 to 20, a simplified form of gear is provided wherein the compensation is approximate.

In this example an ellipse generator is provided but the ellipse is not altered with every alteration of gear ratio but remains constant on all ratios materially greater than 1/1. The gear comprises, in fact, all the components mentioned in connection with Figures 1 to 9 with the exception of the automatic power control component which, however, may be incorporated, if desired.

The modifications in the individual component parts, however, are as follows:—

Figure 13:
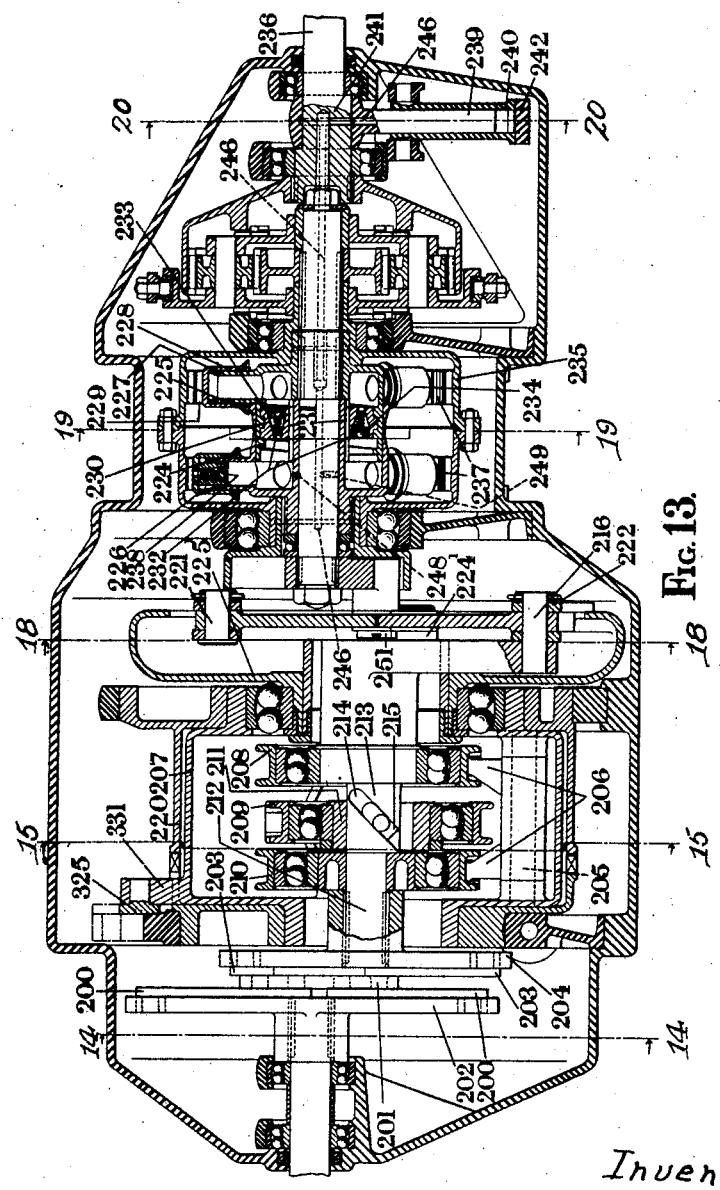
Figure 13 is a vertical longitudinal section through a modified form of construction wherein approximate compensation is provided.
Figure 14:
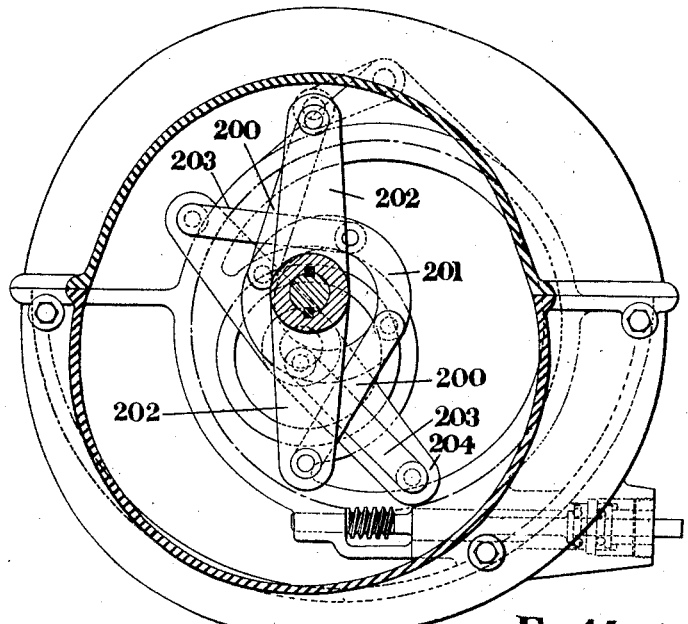
Figure 14 is a vertical cross-sectional view thereof on the line 14—14 of Figure 13.

The universal coupling, although producing the same result as before, embodies pivotal links 200 by which the free member 201 is attached to the driving member 202 (Figures 13 and 14).

Similar links 203 attach the free member to the driven member 204.

The links 200 acting alone would thus restrain the free member 201 to rectilinear motion in a definite direction, whereas the links 203 acting alone are arranged to constrain the free member 201 to a rectinear motion at right angles to the first direction. These two motions superimposed result in the well-known circular motion of the centre element of the Oldham coupling.

By this means the sliding friction of the Oldham coupling is replaced by the much smaller pivot friction of the hinge pins.

Figure 15:
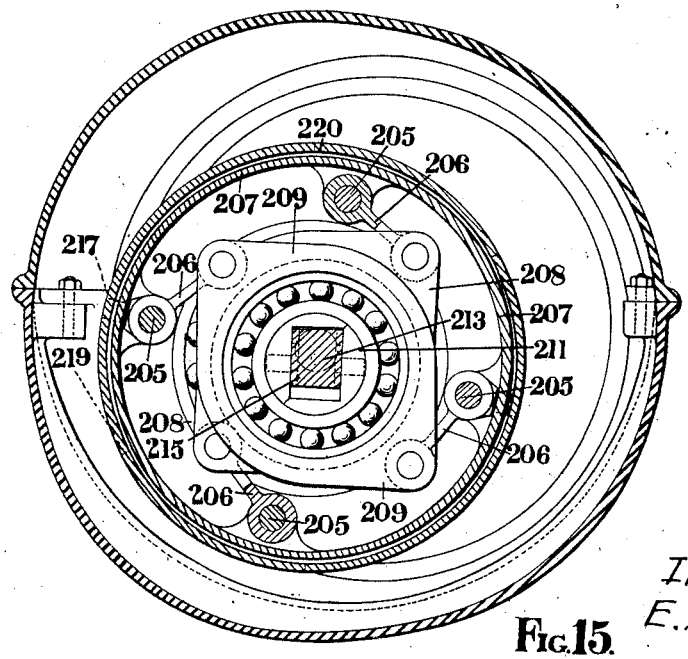
Figure 15 is a vertical cross-sectional view thereof on the line 15—15 of Figure 13.

The ellipse generator differs from that described with reference to Figures 1 to 9 in that the sliding surfaces are replaced by pivots 205 and links 206 arranged to form two parallel motions operating mutually at right angles. All the pivots 205 are embodied in the sleeve 207 and one pair of the links 206 is coupled to the member 208, the other pair being coupled to the member 209, as shown (Figure 15).

An additional member 210 (whose motion is the same as that of the member 208) is provided and coupled to the sleeve 207 through links 206, which latter are bifurcated as indicated in Figure 13.

Between the members 208 and 210 there is provided a member 211 whose eccentricity may be varied. This member 211 is carried upon a rectangular portion 213 of the shaft 212 (which is rigidly connected to the driven member 204). The means for effecting variation of the eccentricity of 211 relatively to the axis of the shaft 212 are as follows:—

Figures 16, 17:
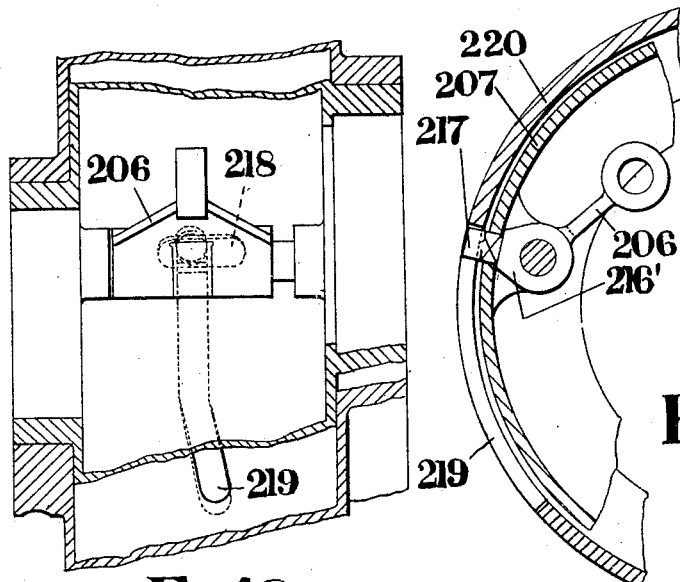
Figures 16 and 17 are fragmental sectional views.

In each two sides of the rectangular portion 213 are formed slots 214 at an angle to the axis but parallel to each other. Sliding blocks 215 attached to the eccentric 211 operate in these slots in such a manner that axial movement of the eccentric 211 effects an alteration in eccentricity (Figures 16 and 17).

At one extreme the eccentric 211 lies concentric with the shaft 212, thus forcing the main crank pin 216 to move in a circular path and at the other extreme in an ellipse, the ellipticity of which is a mean between the extreme ellipses required for complete compensation. Sliding blocks 216' are mounted upon the pivots 205 of the parallel motion for the eccentric system being carried in forked portions of the corresponding links. These blocks are provided with short pins or bosses 217 projecting radially through slots 218 in the wall of the sleeve member 207 through a slot 219 in the main housing or frame 220 of the generator, the slot 218 being parallel to the axis and the slot 219 being inclined partially at 90° and partly at a lesser angle thereto so that upon relative rotation of the members 207 and 220 during change of gear, say when changing from 1/1 to the highest ratio of gear reduction provided for, the eccentric 211 which at commencement of the change is held concentric with the rotating member 212 of the generator is rapidly moved to the other extreme and there held during the remainder of the change.

The angular disposition of the axes of the ellipse is in this form governed by a lever formed integrally with or coupled to the rotatable frame 207 of the generator by means of a link 325 (Figure 13) pivoted at its other end to some fixed part of the casing. The length of this link and the disposition of the fixed pivot in respect to the centre of swing of the main housing of the generator determines the variation in the angle of the axes throughout the range. Neither the position of the fixed pivot nor the length of the link needs alteration after having once been set but both may be adjustable if desired.

It will be noted that in this example of the gear the throw of the main crank pin 216 is fixed with relation to the centre of the rotating member 213 of the ellipse generator.

The displacement of the generator frame 220 is accomplished similarly to that described in connection with Figures 1 to 9, except that hand control only is provided. Thus, a sprocket wheel fixed to the worm spindle and geared by chain (not shown) to a second sprocket and hand-wheel within reach of the driver or any other system for rotation suitable for the purpose may be provided.

Figure 18:
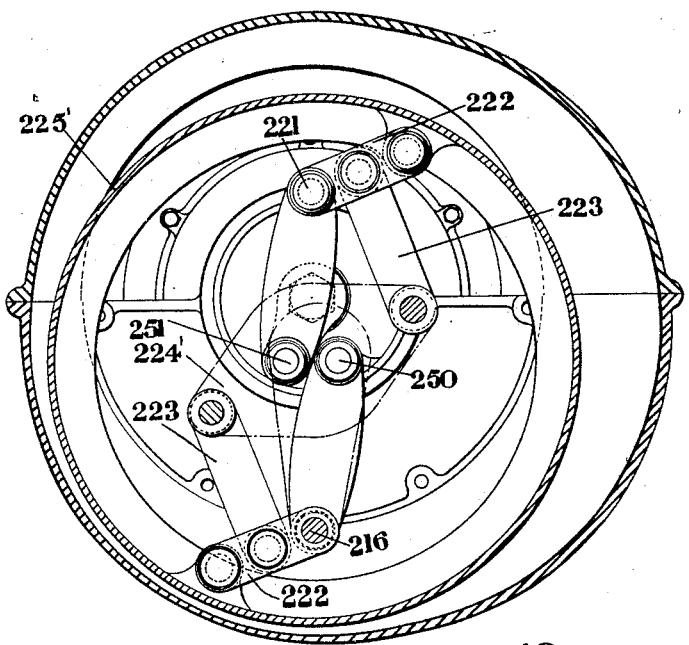
Figure 18 is a vertical cross-sectional view on the line 18—18 of Figure 13.
Figure 19:
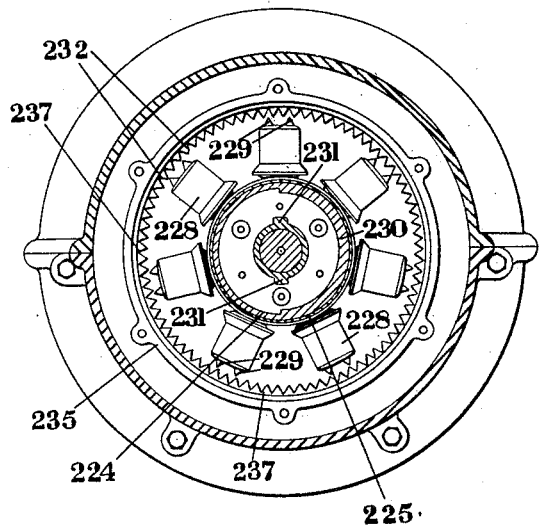
Figure 19 is a vertical cross-sectional view on the line 19—19 of Figure 13.

The duplicator in the modified gear is shown in Figures 13 and 18 and in its essential details is similar to that already described with reference to Figures 1 to 9, a change only in the form and disposition between the members having been made.

As will be seen from Figure 18, the subsidiary crank pin 221 is coupled to the main crank pin 216 by systems of links 222, 223, common member 224$^1$ and annular member 225$^1$.

The variable speed sleeves, as before, are arranged to rotate the one within the other but the diameter of each sleeve being considerably increased and bored out in such a manner that when placed together the two sleeves 224, 225 form a hollow drum, one half of which is rotatable in respect to the other. Around the periphery of each sleeve are formed integrally with it a number of radial hollow bosses 226, 227, bored, as shown in Figure 13, to have communication with the interior of the drum. Surrounding each boss and capable of sliding radially upon it is a cylinder 228 closed at its outer end upon the outer surface of which are formed the pawls 229.

An axial boss is formed in each variable speed sleeve, the boss in one passing over that of the other but being of considerably larger diameter. Upon the inner surface of the larger boss of the sleeve 225 is formed a screw thread 230 of coarse pitch and upon the outer surface of the smaller boss of the sleeve 224 are formed castellations or tongues parallel with the axis. Surrounding the castellated boss and fitting within the larger screwed boss is a piston 232 screwed and tongued to fit each respectively. In the body of the piston are two sets of spring-loaded valves 233, 234, both allowing of intercommunication between the two opposite piston faces but one set allowing it to take place in one direction and the other set in the opposite direction.

Surrounding and completely enclosing the variable speed sleeves 224, 225 is a hollow drum 235 rotationally connected to the driven or slow speed shaft 236 of the gear and having formed upon its inner surface in two planes each of which coincides with the plane containing the radial bosses of the variable speed sleeves respectively internal teeth 237 of V-formation to fit the pawls. One or more safety valves are provided in any suitable position, for instance in one or more of the pawl cylinders (e. g. at 238, Figure 13).

The whole of the internal space of the variable speed sleeves is filled full of oil and is kept full and under pressure by a constantly running pump provided for the purpose.

Figure 20:
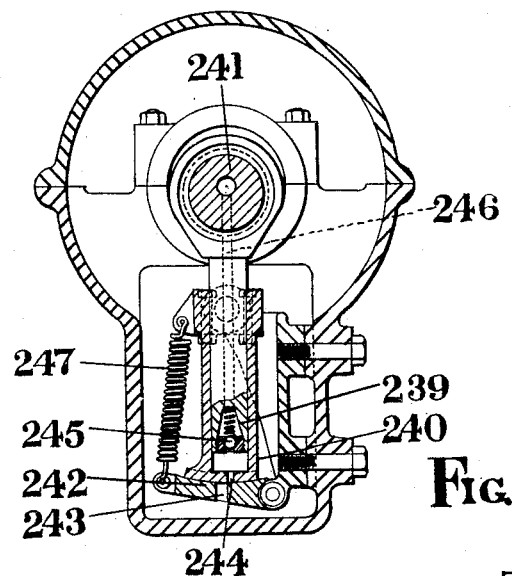
Figure 20 is a vertical cross-sectional view on the line 20—20 of Figure 13.

The pump comprises a ram 239 which is caused to reciprocate within a cylinder 240 by an eccentric 241 on the shaft 236 (Figures 13 and 20).

A pivoted seating is provided at 242 through a port 243 in which oil enters the cylinder 240 via the duct 244. A non-return valve is provided at 245 and ducts 246 through which oil is pumped to a pressure determined by the tension of the spring 247. Leakage of oil is retarded in the usual way, the oil being utilized for forced lubrication.

The action of the device is as follows:— Owing to the relative motion between the two variable speed sleeves 224, 225, each in turn revolving through part of the revolution faster than the other, piston 232 is caused to reciprocate axially, the commencement of the stroke coinciding with the commencement of the accelerated portion of the sleeve revolution. Since the interior of the variable speed sleeves is closed no oil can escape and therefore pressure is set up on one side of the piston and suction on the other. The "hand" of the screw thread 230 with which the thread provided on the piston meshes is so arranged that the pressure is directed on to the ingoing pawls and the suction against the outgoing pawls. The amount of pressure generated is determined by the loading of the piston valves 233, 234, and is such that it is sufficient to maintain the pawls in gear under full load. When this pressure is exceeded the valve opens and the oil passes through the piston 232 to the suction side thereof.

The pawl teeth being of V-formation, outgoing pawls are automatically driven back out of gear with the annular wheel concerned through the agency of the accelerated angular movement; the oil on that side of the piston passing through the piston valve to the other side and so forcing the ingoing pawls into gear. Simultaneously the piston commences its stroke and maintains the pressure required for power transmission.

When the gear is on a ratio of 1/1 I arrange that both sets of pawls engage the respective internally toothed portions of the member 235 by augmenting the quantity of oil imprisoned within the sleeves 224, 225. This is achieved by providing a port 248 which registers with the oil duct 249 only when the pins 250 and 251 (Figure 18) rest at 180° apart—a condition which obtains only when on a gear ratio of 1/1.

Under these conditions the pump delivers oil through 249 and 248 and forces outwards both sets of pawls.

Upon subsequent alteration of the gear ratio the port 248 is moved out of register with the duct 249 and the excess pressure is relieved, as soon as the piston 232 commences to move axially, by means of the safety valve 238.

Having now described my invention, what I claim as new and desire to secure by Letters Patent is:—

1. Infinitely variable gear of the type described including a main driving shaft, a driven shaft, two alternately operating driving members for said latter shaft, two intermediate driving members, driving means between said main driving shaft and said intermediate driving members respectively, means constraining said intermediate driving members to a substantially elliptical path, means for modifying the constraint imposed upon the motion of said intermediate members from an ellipse to a circle, a driving connection between one of said intermediate driving members and one of said alternately operating driving members, a driving connection between the other of said intermediate driving members and the other of said alternately operating driving members and means for putting into and out of operation automatically said driving connections.

2. An infinitely variable gear as claimed in claim 1, wherein the driving means between said main driving shaft and said intermediate driving members including Oldham coupling mechanism.

3. An infinitely variable gear of the type described, including a main driving shaft, a driven shaft, two alternately operating driving members for said latter shaft, two intermediate driving members, driving means between said main driving shaft and said intermediate members respectively, means constraining said intermediate driving members to a mean elliptic path on all gear ratios higher than about 1/1, a driving connection between one of said intermediate driving members and one of said alternately operating driving members, and a driving connection between the other of said intermediate driving members and the other of said alternately operating driving members.

4. An infinitely variable gear as claimed in claim 1, including also power operated speed ratio control mechanism.

5. An infinitely variable gear as claimed in claim 1, including also automatically operating power speed ratio control mechanism.

6. An infinitely variable gear of the type described, including a main driving shaft, a driven shaft, positive clutching means on said driven shaft, and two alternately operating driving members for said latter shaft, two intermediate driving members, driving means between said main driving shaft and said intermediate driving members respectively, means constraining said intermediate driving members to a substantially elliptic path, and positive clutching means associated with each of said two alternately operating driving members, and adapted alternately to engage the clutching means on said driven shaft, a driving connection between one of said intermediate driving members and one of said alternately operating driving members, and a driving connection between the other of said intermediate driving members and the other of said alternately operating driving members.

In testimony whereof I have signed my name to this specification.

ERNEST ABINGTON VESSEY.